United States Patent [19]

Omori et al.

[11] 4,233,944
[45] Nov. 18, 1980

[54] METHOD FOR CONTROLLING IGNITION TIMING OF INTERNAL COMBUSTION ENGINE

[75] Inventors: Norio Omori; Hideya Fujisawa, both of Kariya; Yutaka Kawashima, Okazaki; Hisasi Kawai, Toyohashi; Kazuo Iwase, Okazaki; Masakazu Ninomiya, Kariya, all of Japan

[73] Assignees: Nippondenso Co., Ltd., Kariya; Nippon Soken, Inc., Nishio, both of Japan; part interest to each

[21] Appl. No.: 47,932

[22] Filed: Jun. 12, 1979

[30] Foreign Application Priority Data

Jul. 4, 1978 [JP] Japan ................................ 53/81613

[51] Int. Cl.³ ............................................. F02P 5/14
[52] U.S. Cl. ............................ 123/416; 123/146.5 A; 123/425
[58] Field of Search ....... 123/117 D, 117 R, 119 ED, 123/146.5 A, 148 E; 73/35

[56] References Cited

U.S. PATENT DOCUMENTS

| | | | |
|---|---|---|---|
| 4,002,155 | 1/1977 | Harned et al. | 73/35 |
| 4,120,272 | 10/1978 | Douaud et al. | 123/117 D |
| 4,153,020 | 5/1979 | King et al. | 73/35 |

Primary Examiner—Charles J. Myhre
Assistant Examiner—Andrew M. Dolinar
Attorney, Agent, or Firm—Cushman, Darby & Cushman

[57] ABSTRACT

A method for controlling the ignition timing for the internal combustion engine is disclosed. When it is decided that the engine load is large on the basis of the engine number of revolutions per minute and intake pressure. If the engine is in the knocking condition, a step lead angle is added to the present lead angle value in the range between a set lead angle and a minimum lead angle. If the engine is not in the knocking condition, on the other hand, a step lead angle is subtracted from the present lead angle value in the above-mentioned range. By contrast, when it is decided that the engine load is small on the basis of the engine r.p.m. and intake pressure. The lead angle control of the present lead angle value is stopped so that the present lead angle is set at the above-mentioned set lead angle or the minimum lead angle value.

2 Claims, 12 Drawing Figures

METHOD FOR CONTROLLING IGNITION TIMING OF INTERNAL COMBUSTION ENGINE

BACKGROUND OF THE INVENTION

1. Field of the Invention

The present invention relates to an ignition timing control apparatus for controlling the angle delay of the ignition timing by detecting the knocking of an internal combustion engine.

2. Description of the Prior Art

In a conventional symmetrical ignition timing control apparatus, the ignition angle is delayed upon detection of a knocking of the internal combustion engine and advanced in the absence of a knocking, thereby equalizing the amounts of angle lead and delay. In controlling the ignition timing by such an apparatus, the ratio between the frequency of detection of knockings and non-detection thereof is 1 to 1, so that the amounts of angle lead and delay are balanced out on the average. As a result, even though a small knocking (trace knocking) is detected, the knocking occurs once every two detecting operations, thereby leading to the shortcomings of a higher engine noise discordant to the driver.

A method for obviating the above-mentioned disadvantage is by an asymmetrical control in which the amount of angle delay is increased over that of angle delay to reduce the engine noise. Specifically, once a knocking is detected and the angle is delayed, the ignition timing of a predetermined number of subsequent ignitions is controlled at the set angle delay, which is advanced in the absence of subsequent knocking. If the delay angle is maintained at a fixed value for a predetermined number of ignitions in this way, however, it is impossible to promptly reduce the angle delay of ignition timing in the case where the operating condition of the internal combustion engine changes and is released from the knocking region and the knocking is eliminated.

SUMMARY OF THE INVENTION

Accordingly, it is an object of the present invention to provide an ignition timing control apparatus for the internal combustion engine, comprising means for reducing the number of ignitions associated with a predetermined angle delay upon detection of a transient operating condition of the internal combustion engine. The above-mentioned disadvantage of the conventional apparatuses is obviated by changing the delay of ignition timing in this way. In the case where a change in the operating condition of the internal combustion engine results in the elimination of knocking and it is desired to reduce the amount of delay of ignition timing, the ignition timing delay is rapidly reduced, thereby effectively advancing the ignition timing. It is thus possible to reduce the noise of the internal combustion engine under normal operating conditions on the one hand and to improve the performance thereof under a transient operating condition on the other hand.

DESCRIPTION OF THE PREFERRED EMBODIMENTS

Figure 1:
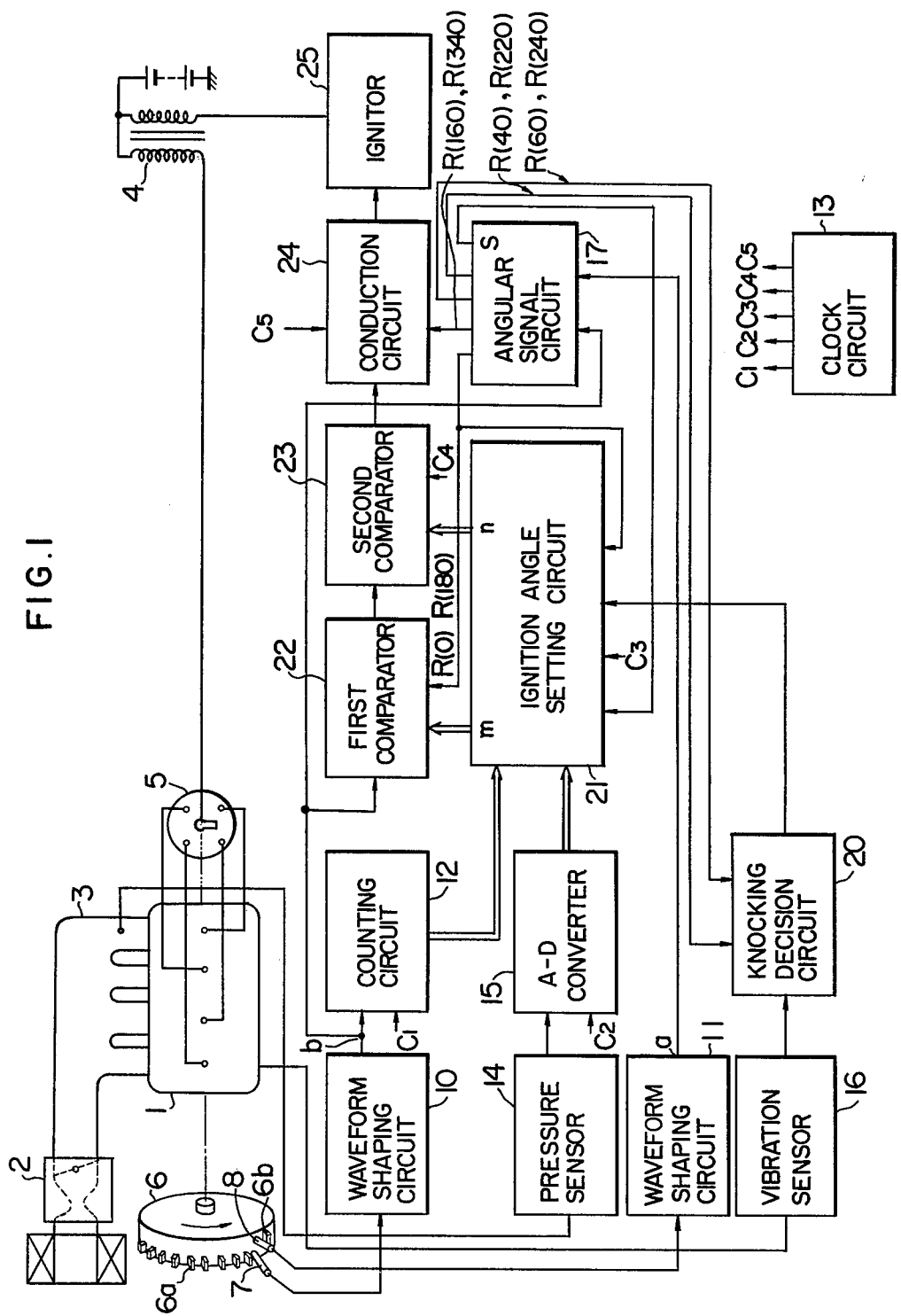
FIG. 1 is a block diagram showing an embodiment of the apparatus according to the present invention.

The present invention will be described below with reference to the embodiments shown in the accompanying drawings. In FIG. 1, an engine 1 is a well-known four-cylinder four-cycle spark ignition type engine. The mixture gas generated in a carburetor is taken in through an intake manifold 3, and a high voltage is applied to an ignition plug from an ignition coil 4 through a distributor 5.

A rotational angle sensor 7 and a reference angle sensor 8 each comprising an electromagnetic pickup are opposedly provided on a ring gear 6 which rotates in synchronism with the crank shaft of the engine 1. If the teeth 6a of the ring gear 6 number 115, the rotational angle sensor 7 generates a pulse signal of a frequency of 1150 Hz at the engine speed of 600 r.p.m. (=10 r.p.s.) The reference angle sensor 8 is opposed to the reference position tooth 6b of the ring gear 6 which is formed 60 degrees before the top dead center of the first cylinder for generating a reference pulse signal 60 degrees before the top dead center of the first cylinder.

The waveform shaping circuits 10 and 11 are well known ones for amplifying and shaping into a rectangular form the output signals of the rotational angle sensor 7 and the reference angle sensor 8 respectively. The counting circuit 12 is for counting the number of revolutions of the engine and producing a binary code output in response to the output pulse of the waveform shaping circuit 10 and the clock pulse C1 of the clock circuit 13.

The counting circuit 12, the detail of which is not shown, comprises a NAND gate which is opened for passing the clock pulse C1 from the clock circuit 13 in response to the output pulse from the waveform shaping circuit 10, a counter for counting the clock pulses that have passed the NAND gate, a latch circuit or temporary memory for temporarily storing the value counted by the counter and determining the number of revolutions in response to a binary code, and a signal generator for generating a counter reset signal and a storage command signal for the latch circuit in response to the output pulse from the waveform shaping circuit 10.

The clock circuit 13 comprises a well-known rectangular wave oscillator circuit, a frequency divider circuit for dividing the frequency of the rectangular wave generated from the oscillator circuit, a waveform shaping circuit for transforming the output of the frequency divider circuit into pulses with very small width, and a logic circuit. The clock circuit 13 applies to each block of the counting circuit 12 the clock pulses C1 to C5 which form reference time signals.

The pressure sensor 14 is of a well-known semiconductor type, which detects the intake pressure in the intake manifold 3 and produces an output in the form of analog voltage. The intake pressure in the intake manifold 3 corresponds to the load of the engine 1. If the speed of the engine 1 remains the same, the smaller the load, the smaller the intake pressure, while with the increase in the load, the intake pressure is increased. In this way, the pressure sensor 14 detects the load of the engine 1 and acts as a load sensor.

The A-D converter 15 is for digital conversion of the analog output voltage of the pressure sensor 14 in response to the clock pulse C2 of the clock circuit 13, and includes a memory.

Figure 2:
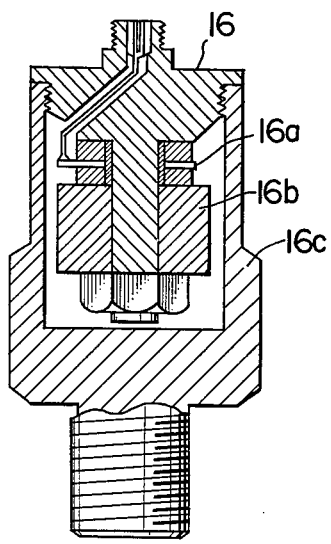
FIG. 2 is a longitudinal sectional view of a vibration detector used with the apparatus shown in FIG. 1.

The vibration sensor 16 is of piezoelectric type mounted on the cylinder block of the engine 1 and uses a piezoelectric element to produce a voltage in accordance with the vibration acceleration. The vibration sensor 16 has a construction such as shown in FIG. 2. The piezoelectric element 16a is contained within the case 16c together with the member 16b for deforming the piezoelectric element 16a in response to vibrations and fixed on the cylinder block by means of a screw or the like.

The angular signal circuit 17 is for producing an angular signal and a data switching signal S in the form of R(0), R(180) and R(340) at a predetermined crank angle of the first cylinder of the engine 1 in response to the output pulses of the waveform shaping circuits 10 and 11.

Now, the position of the tooth 6a of the ring gear 6 which is nearest at the angle of 60 degrees or less before the top dead center of the first cylinder is defined as R(0), and the angle of the tooth equal to A in delay from R(0) or less than A but nearest to A as R(A). Also, R(180) is defined as the angle of the tooth equal to 180 degrees in delay from R(0) or less than 180 degrees but nearest to 180 degrees. Therefore, the angle of R(180) is almost an integral multiple of 3.13 (=360/115) corresponding to the angle of the tooth 6a.

The knocking decision circuit 20 is for deciding whether or not the engine 1 is knocking in response to the output signal of the vibration sensor 16 and the signal from the angular signal circuit 17. The output signal of the knocking decision circuit 20 is applied to the ignition angle setting circuit 21.

The ignition timing setting circuit 21 comprises a plurality of integrated circuits or microcomputers, and is impressed with a digital signal produced from the counting circuit 12 in accordance with the engine speed, the clock pulse C3 of the clock circuit 13, the digital signal produced from the A-D converter 15 in accordance with the intake pressure in the intake manifold 3 and the angular signals of the angular signal circuit 17. If it is decided that the load of the engine 1 is large in response to the engine r.p.m. and intake pressure when the engine is not knocking, the lead angle value is determined by adding the step lead angle $\Delta\theta$ to the present lead angle value $\theta$ in synchronism with the engine r.p.m. in the range of the minimum lead angle $\theta$min and the lead angle value $\theta$p set to the minimum advance for best torque (MBT) in accordance with the engine r.p.m and the intake pressure. If the engine begins to knock, on the other hand, $\Delta\theta$ is subtracted from the present lead angle $\theta$ in synchronism with the engine r.p.m. In this way, the setting circuit 21 operates in such a manner that the amount of lead angle is controlled in accordance with the knocking conditions with the initial lead angle set at the pregrammed value $\theta_0$.

When it is decided that the load of the engine 1 is small on the basis of the engine r.p.m. and the intake pressure, the setting circuit 21 stops the control of the lead angle based on the knocking conditions and sets the lead angle at the set value of $\theta$p. Further, when the calculated angle lead exceeds $\theta$p, the setting circuit 21 sets the lead angle at $\theta$p. When the calculated lead angle is reduced below the minimum lead angle $\theta$min, on the other hand, the lead angle value is set at $\theta$min.

The lead angle value set with reference to the top dead center of the engine 1 is converted by the setting circuit 21 into a delay angle with respect to another reference of the crank angle. This angle delay is divided by 3.13 (=360 degrees/115) which is an angle corresponding to one tooth 6a of the ring gear 6. This quotient is applied in binary code to the first and second comparators 22 and 23 as first and second outputs m and n respectively. Assuming that the delay angle is 40 degrees, 40 degrees=12×3.13 degrees+0.77 . . . degrees. The first output value m is 01100 which is a binary version of 12, while the second output value n is expressed as the remaining angle of 0.77 . . . degrees divided into the engine r.p.m, time converted and expressed in a binary code.

The comparators 22 and 23 are for comparing the value calculated by the ignition angle setting circuit 21 with the actual crank angle of the engine 1 and for producing an output signal when they agree with each other digitally. The first comparator 22 is reset by the reference angle signals R(0) and R(180) of the angle signal circuit 17 from which the comparison is started. When the first output value of the outputs of the ignition angle setting circuit 21 such as the data m of five bits coincides with the number of pulses produced from the waveform shaping circuit 10, the comparator 22 produces an output signal thereby to reset the second comparator 23. At this time point, the second comparator 23 begins comparison and produces an output signal when the second output of the ignition angle setting circuit 21, for instance, the data n of ten bits, coincides with the number of clock pulses C4 produced from the clock circuit 13. This output signal constitutes an ignition timing signal.

The conduction circuit 24 is a well-known one provided for the purpose of determining the time for conducting and starting the ignition coil 4 in response to the output signal of the second comparator 23 and the angular signals R(160) and R(340) of the angular signal circuit 17. The ignitor 25 power amplifies the output signal of the conduction circuit 24 for actuation of the ignition coil 4.

The essential circuit blocks will be explained below in detail.

Figure 3:
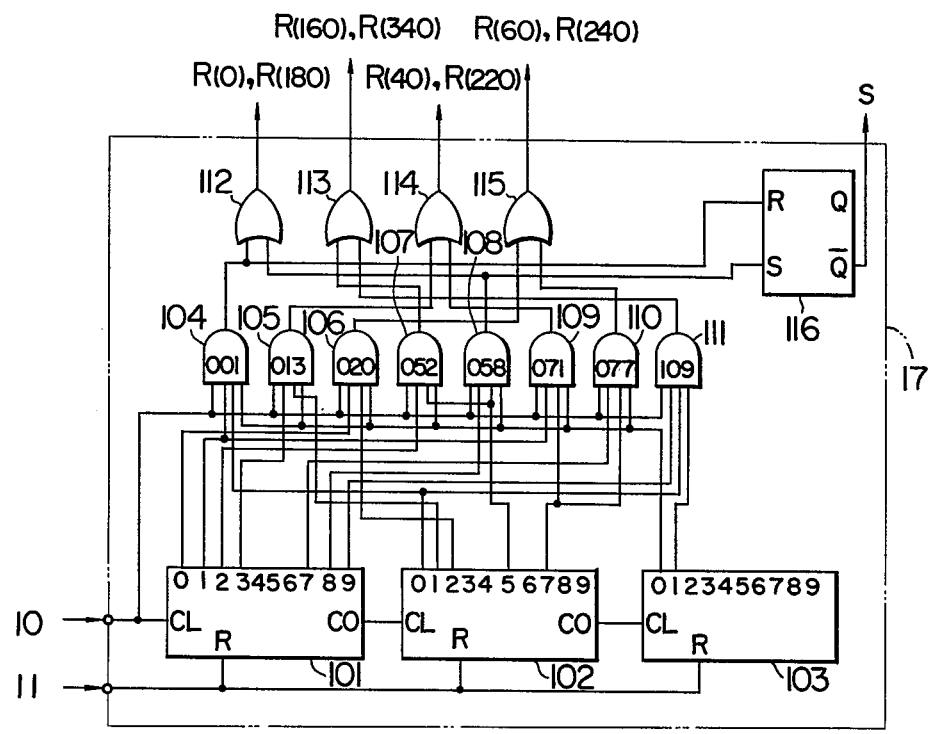
FIGS. 3, 4, 9 and 10 are diagrams showing electrical circuits of the essential parts of the apparatus of FIG. 1.

First, explanation will be made of the angular signal circuit 17 with reference to FIG. 3. The angular signal circuit 17 includes counters 101, 102 and 103 with a divider, four-input AND gates 104, 105, 106, 107, 108, 109, 110 and 111, OR gates 112, 113, 114 and 115, and an R-S flip-flop 116.

Figure 8:
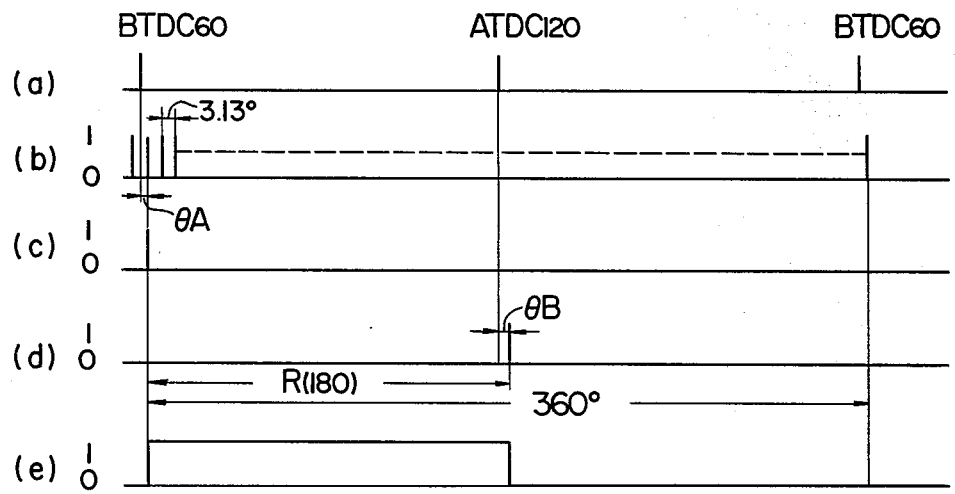
FIG. 8 shows waveforms for explaining the operation of the essential parts of the apparatus of FIG. 1.

The clock terminal CL of the counter 101 is impressed with the output pulses of the waveform shaping circuit 10 shown in (b) of FIG. 8, and the reset terminal R thereof is impressed with the output pulses of the waveform shaping circuit 11. The clock terminal CL of the counter 102 is impressed with the carry-out (CO) output of the counter 101, and the reset terminal R thereof is impressed with the output pulses of the waveform shaping circuit 11. The clock terminal of the counter 103 is impressed with the carry-out (CO) of the counter 102, while the reset terminal R thereof is impressed with the output pulses of the waveform shaping circuit 11.

Each time a counter counts ten pulses, one pulse is produced from the carry-out terminal CO of the counter. Therefore, the counters 101, 102 and 103 operates as a decimal counter covering 0 to 999 as a whole.

The AND gate 104 is for generating the signal R(0) and is connected with the clock terminal CL of the counter 101 and the output terminal "1" and the output terminals "0" of the counters 102 and 103. The AND gate thus produces an angular signal R(0) of (c) of FIG. 8 when one pulse is counted.

In similar fashion, the AND gates 105, 106, 107, 108, 109, 110 and 111 produce the angular signals R(40), R(60), R(160), R(180), R(220), R(240) and R(340) when 13, 20, 52, 58, 71, 77 and 109 pulses of the waveform shaping circuit 10 are counted respectively.

The OR gate calculates a logic sum of signals R(0) and R(180) and produces an angular signal R(0).R(180) which is the result of superimposing one signal on the other signal. Similarly, the OR gate 113 calculates a logic sum of R(160) and R(340), the OR gate 114 a logic sum of R(40) and R(220), and the OR gate 115 a logic sum of R(60) and R(240), thus producing angular signals which are the result of superimposing one signal on the other signal respectively.

The R-S flip-flop 116 has a reset terminal R impressed with the signal R(0) and a set terminal S impressed with the signal R(180), and produces a data switching signal S shown in (e) of FIG. 8.

The signals R(0) to R(340) correspond to the teeth 6a of the ring gear 6. The signal R(0) corresponds to the first tooth following the arrival of the reference angular signal, the signal R(40) to the 13th tooth, the signal R(60) to the 20th tooth, the signal R(160) to the 52nd tooth, the signal R(180) to the 58th tooth, the signal R(220) to the 71st tooth, the signal R(240) to the 77th tooth, and the signal (34) to the 109th tooth.

Figure 4:
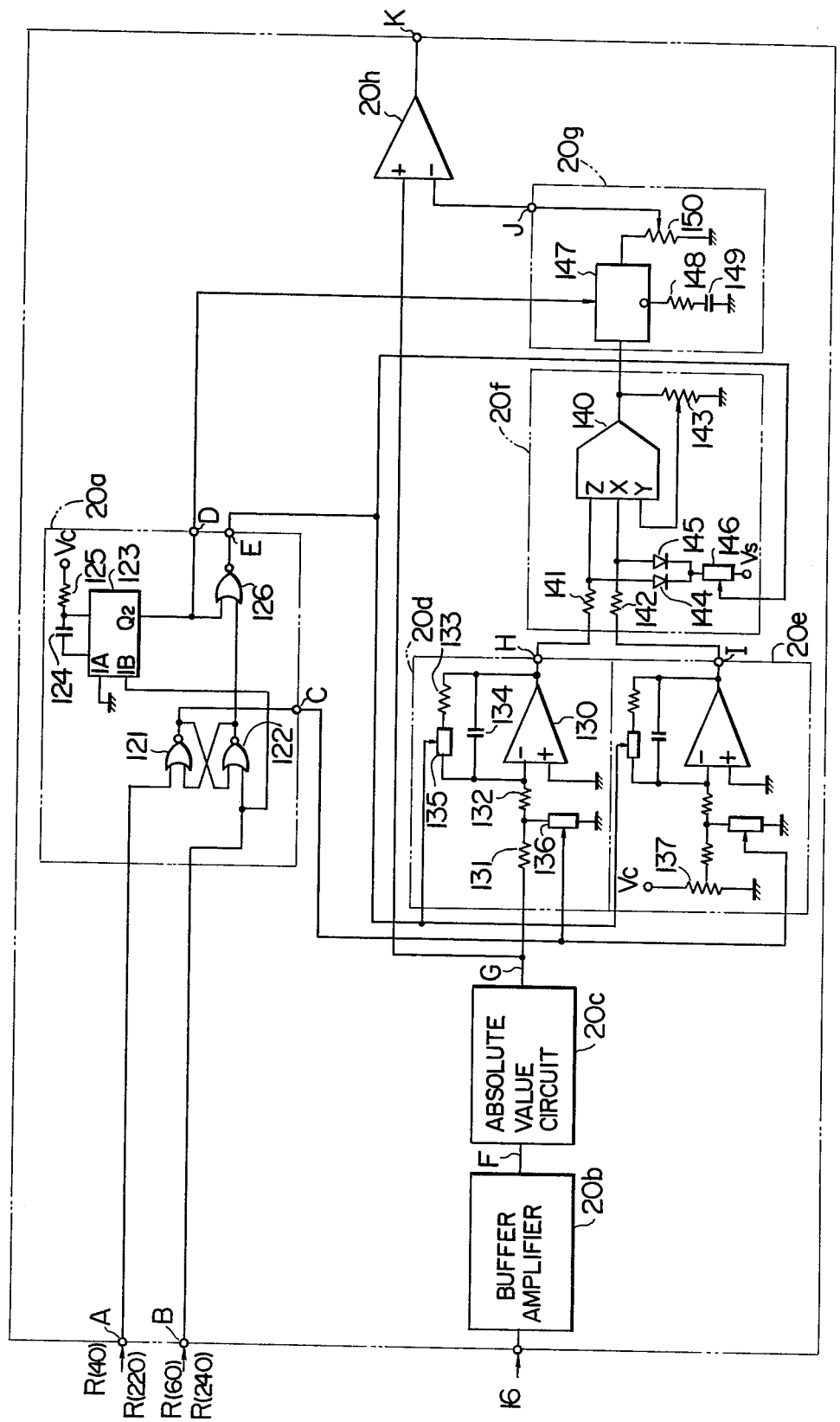
Figure 5:
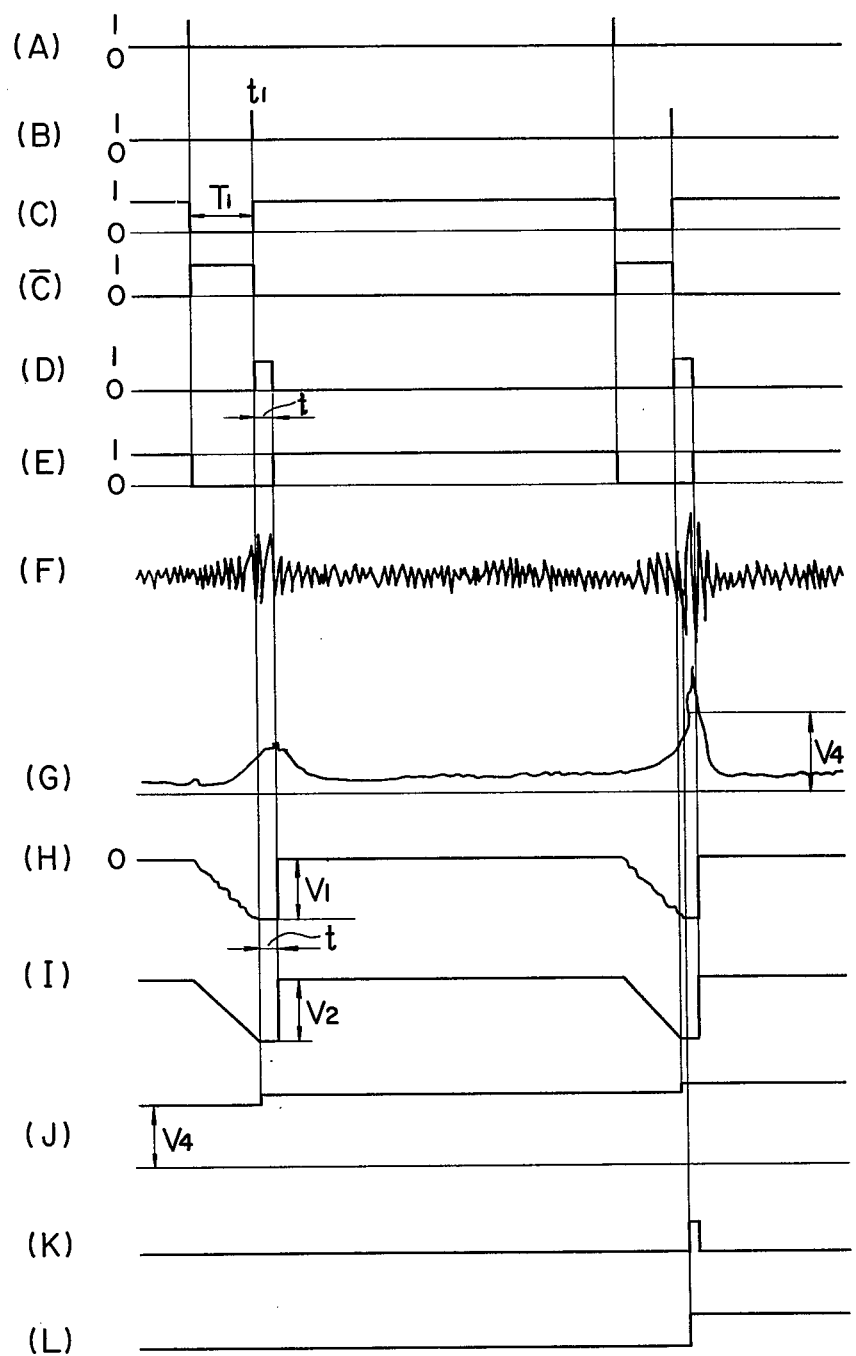
FIG. 5 shows waveforms for explaining the operation of the parts of the circuit of FIG. 4.

The decision circuit 20 will be explained with reference to the diagrams of FIGS. 4 and 5. A circuit diagram and a waveform diagram for explaining the operation are shown in FIGS. 4 and 5 respectively. In FIG. 4, the control pulse generator 20a includes an R-S flip-flop and a monostable multivibrator. The R-S flip-flop includes a pair of NOR gates 121 and 122. The NOR gate 121 is impressed with the signals R(40) and R(220) produced from the angular signal circuit 17 as shown in (A) of FIG. 5, i.e., a signal representing substantially 20 degrees before the top dead center of each cylinder. The NOR gate 122, on the other hand, is impressed with the signals R(60) and R(240) shown in (B) of FIG. 5, i.e., a signal substantially representing the top dead center (TDC) of each cylinder.

The output of the NOR gate 121 takes the waveform as shown in (C) of FIG. 5, and the output of the NOR gate 122 the waveform shown in (C̄) of FIG. 5.

The monostable multivibrator includes an IC for a monostable multivibrator 123 (SN74123 made by Texas Instruments), an external capacitor 124 and a resistor 125, and produces a pulse signal of pulse with of about 100 microseconds shown in (D) of FIG. 5 upon application of the signal R(60) or R(240) to the input terminal 1B thereof.

The NOR gate 126 is impressed with the output signal of the NOR gate 122 and the output signal of the monostable multivibrator, and produces a signal shown in (E) of FIG. 5.

The buffer amplifier 20b is an impedance converter for converting the output signal of the vibration sensor 16 into a low impedance signal while at the same time amplifying the same. The absolute value circuit 20c is a well-known one for producing an absolute value of a positive or negative signal and operates in such a manner as to fold to the positive side the negative portion of the vibration waveform signal of the vibration sensor 16 applied through the buffer amplifier 20b. If the buffer amplifier 20b produces an output signal as shown in (F) of FIG. 5, for instance, the absolute value circuit 20c produces a signal as shown in (G) of FIG. 5.

The first integrator 20d is for integrating the waveform of (G) of FIG. 5 for the period from about 20 degrees before the top dead center of each cylinder up to the top dead center, and comprises an operational amplifier 130, resistors 131, 132, 133, a capacitor 134 and analog switches 135 and 136. The analog switch 135 is subjected on on-off control by the signal shown in (E) of FIG. 5 which is produced from the control pulse generator 20a, while the analog switch 136 is subjected to on-off control by the signal shown in (C) of FIG. 5.

When the signal (C) of FIG. 5 is "1", the analog switch 136 is turned on, while when the signal (E) of FIG. 5 is "1", the analog switch 136 is turned on. Therefore, when the output of the first integrator 20d is reduced to 0 V and the signals C and E are reversed to "0", the analog switches 135 and 136 are both turned off, so that the first integrator 20d begins the integration in negative direction. The integration continues until the analog switch 135 is turned on again. The output signal of the absolute value circuit 20c is, however, applied for the period during which the analog switch 136 is off, i.e., for the period of T1 from 20 degrees before the top dead center to the top dead center of the cylinder.

During the time t when the signal (D) of FIG. 5 is "1", the integrator 20d holds itself and therefore the output remains unchanged. Thus the output signal waveform of the first integrator 20d takes the form as shown in (H) of FIG. 5, and the output voltage V1 thereof is expressed as $$-\int_0^{T_1}$$

Gdt where T1 is the period of time during which signal C is "0" and G is the vibration waveform.

The second integrator 20e has substantially the same circuit configuration, the only difference being that the second integrator 20e is impressed with a constant voltage from the voltage divider 137 in place of a vibration waveform as an integration input. As a result, the output signal of the second integrator 20e takes the form as shown in (I) of FIG. 5, and the output voltage V2 thereof is expressed as $$-\int_0^{T_1}$$

VRdt where VR is the output voltage of the voltage divider 137. It is seen from this formula that the output voltage V2 is proportional to the time T1.

The divider 20f is for dividing the output voltage of the first integrator 20d by the output voltage of the second integrator 20e, and comprises a multiplier-divider (8013 of Intersill Inc.) 140, resistors 141 and 142, a voltage divider 143, diodes 144 and 145 and an analog switch 146. The analog switch 146 is subjected to on-off control by the signal E shown in (E) of FIG. 5 and impressed with the negative source voltage Vs.

When the signal E is "1", the analog switch 146 is on, and therefore the negative source voltage Vs is applied to the input terminals X and Z of the multiplier 140. When the signal E is "0", on the other hand, the input terminal Z is impressed with the output voltage of the first voltage integrator 20d and the input terminal X with the output voltage of the second integrator 20e. The multiplier 140 calculates 10Z/X in response to the adjustment of the voltage divider 143, and therefore the output V3 thereof is given as $$V3 = 10 \times (-\int_0^{T_1} Gdt) \div (-\int_0^{T_1} VRdt) = \frac{K_1 \int_0^{T_1} Gdt}{T_1}$$

where K1 is a constant of proportionality ($=10/VR$).

The sample-and-hold circuit 20g comprises a sample-and-hold IC (IH5110 made by Intersill) 147, a resistor 148, a capacitor 149 and a voltage divider 150. The sample-and-hold circuit 20g thus samples and holds the output signal of the divider 20f in response to the signal D shown in (D) of FIG. 5 and produces the signal shown in (J) of FIG. 5. The output voltage of IC 147 is equal to the output voltage V3 of the divider 140, which is divided by the voltage divider 150 and produced as a voltage V4.

Therefore, the output voltage V4 is expressed as $$V4 = \frac{K_1 \cdot K_2 \int_0^{T_1} Gdt}{T_1} = \frac{K \int_0^{T_1} Gdt}{T_1}$$

where K2 is the voltage-dividing ratio of the voltage divider 150, and $K = K_1 \cdot K_2$. As seen from the above equation, the output voltage V4 represents an average value of the vibrations from substantially 20 degrees before the top dead center to the top dead center of each cylinder of the engine 1.

The comparator 20h is impressed with the output signals of the absolute value circuit 20c and the sample-and-hold circuit 20g and compares the instantaneous value of the vibrations detected by the vibration sensor 16 with the average value thereof from substantially the point 20 degrees before the top dead center to the top dead center. The comparator 20h thus produces a "1" signal, when the instantaneous value becomes larger than the average value.

The engine 1 knocks after the top dead center of each cylinder. Upon occurrence of a knocking, the instantaneous value of the vibration exceeds the average value thereof and therefore the comparator 20h produces a pulse signal as shown in (K) of FIG. 5.

If it is desired to widen the output pulse signal of the comparator 20h, an R-S flip-flop may be added with the reset input thereof impressed with the signal B shown in (B) of FIG. 5 and with the set input thereof impressed with the output signal of the comparator 20h. As a result, an output as shown in (L) of FIG. 5 is produced.

In this way, the output signal of the comparator 20h, i.e., the output signal of the decision circuit 20 is used to decide whether or not the engine 1 is knocking.

The power circuits and power supplies Vc and Vs used with respective elements are well known and therefore not shown.

Next, explanation will be made of the ignition angle setting circuit 21. The ignition angle setting circuit 21 includes a microcomputer (TLCS-12 made by Toshiba). The construction and operation of the microcomputer will not be explained. Instead, only the functions of control and calculation thereof will be explained.

Figure 6:
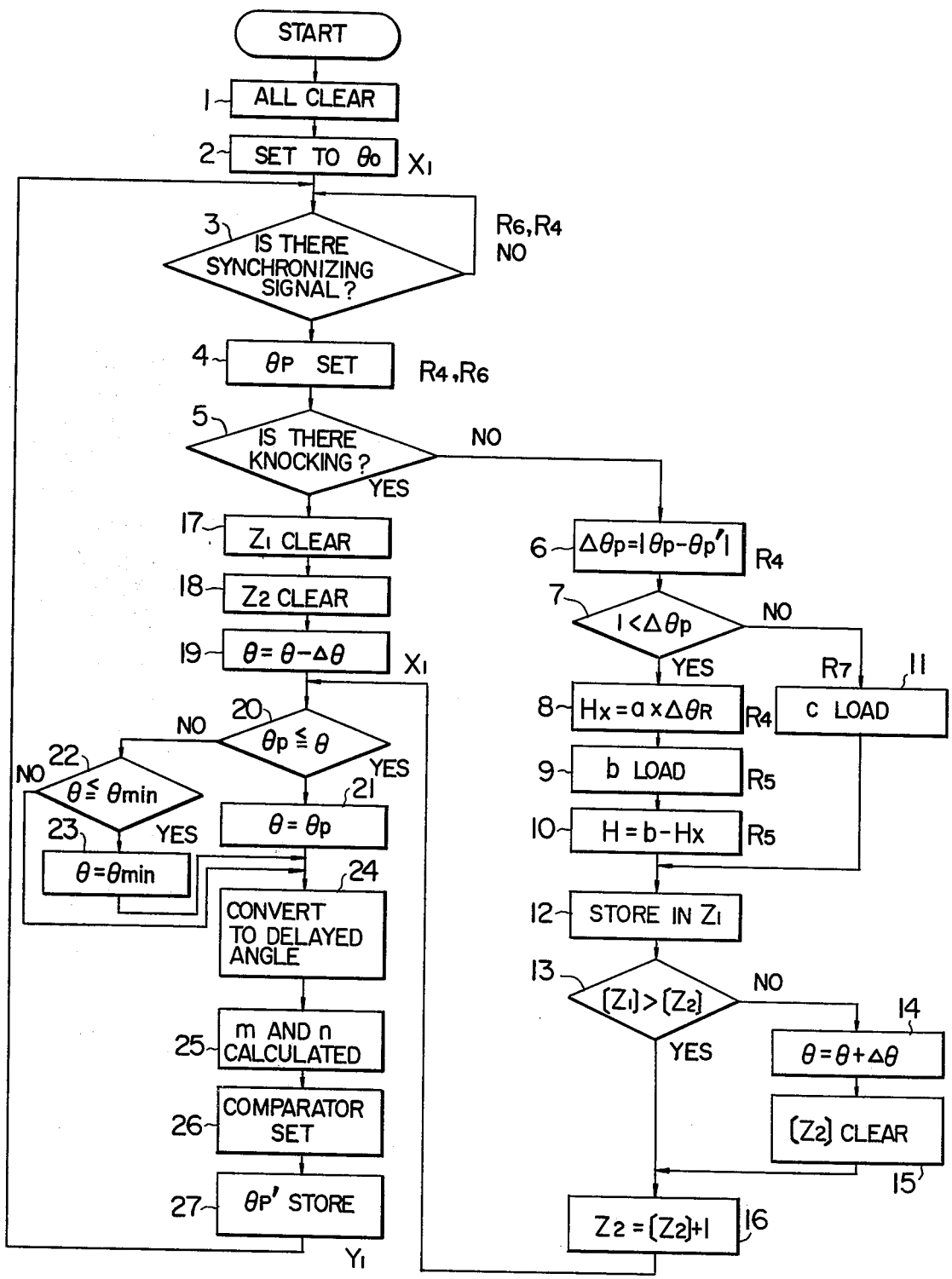
FIG. 6 is a flowchart for a microcomputer used as an ignition angle setting circuit with the apparatus of FIG. 1.
Figure 7:
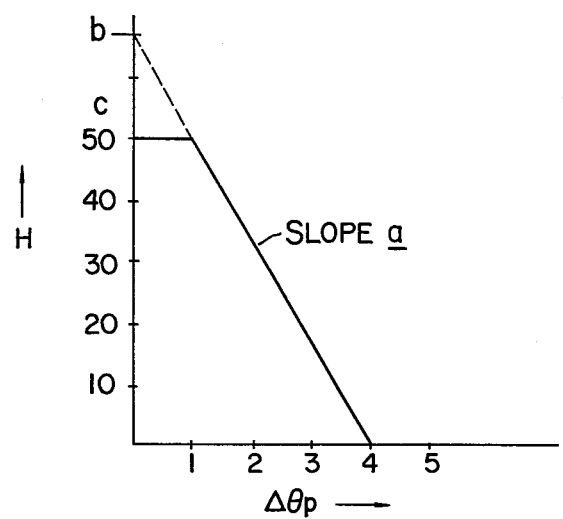
FIG. 7 is a characteristics diagram showing the relation between the change in the ignition timing according to the change in operating condition of the internal combustion engine and the number of ignitions for which the lead angle of ignition timing is maintained in the apparatus shown in FIG. 1.

In FIG. 6 showing a flowchart of the microcomputer, turning on a switch not shown causes power to be thrown in and the calculation to be started. In the first step, all the values in the read-write memory (RAM) are cleared. In the second step, a predetermined lead angle $\theta_0$ forming the initial lead angle is read from the read-only memory (ROM) and stored in the area X of RAM. Under this condition, the engine is not yet started. When the engine starts to run by the starter, the third step is entered, in which it is decided whether or not the pulses R(0) and R(180) are produced at each half rotation of the crank shaft in synchronism with the crank shaft rotation. If the answer is "No", the arrival of the signal is awaited. If the answer is "Yes", on the other hand, transfer is made to the fourth step. In the fourth step, a preprogrammed set lead angle $\theta p$ is set. The set lead angle $\theta p$ is a sum of the lead angle value determined by the engine r.p.m and the lead angle value depending on the engine intake pressure. For example, the area $X_N$ of ROM is determined at intervals of 200 r.p.m in the engine r.p.m range from 0 to 8000. In other words, $X_N$ corresponds to 40 words. The value of $X_N$ in ROM is read and calculated by eight-division interpolation. On the other hand, the address of area Xp in ROM is determined at the intervals of 20 mmHg in the range of intake pressure from 760 mmHg to 0 mmHg. In other words, Xp corresponds to 38 words. The amount of Xp is read and the value for each 5 mmHg is determined by four-division interpolation. The routine of interpolation is well known and therefore will not be explained. The lead angle value determined by interpolation of the engine r.p.m is added to the lead angle value determined by interpolation of the intake pressure and the sum is stored in the general registers R4 and R6 among R0 to R7 of the central processor unit (CPU), while at the same time proceeding to the next step. By the way, the sum $\theta p$ is set in such a manner as to coincide with MBT. In the fifth step, it is decided whether or not the engine 1 is knocking, on the basis of the output signal of the decision circuit 20. If the answer is "No", transfer is made to the sixth step. In the sixth step, the lead angle value $\theta p'$ immediately preceding to the lead angle value $\theta p$ is read from Y1 of the area Y of RAM, so that the absolute value of the difference between it and $\theta p$ which is stored in the general register R4 is determined. The result remains stored in the general register R4. The absolute value is calculated in such a manner that if $\theta p - \theta p' \geq 0$, the result remains stored in the general registers R4; while if $\theta p - \theta p' < 0$, the absolute value is determined by reversing each bit and adding unity (1) thereto. The seventh step is for determining whether or not the calculation result $\Delta \theta p$ is larger than 1. If the answer is "Yes", transfer is made to the eighth step;

while if the answer is "No", a jump is made to the 11th step. In the eighth step, the constant a is read from ROM and multiplied by the value of $\Delta\theta p$ stored in the general register R4. The calculation result Hx remains stored in the general register R4. In the ninth step, the constant b is loaded on the general register R5 from ROM. In the 10th step, the information Hx stored in the general register R4 is subtracted from the information b stored in the general register R5. The result of the calculation remains stored in the general register R5. In the 11th step, the constant c is loaded on the general register R7 from ROM. If the route is followed through the 10th step, the information stored in the general register R5 is stored in Z1 of the area Z of RAM, while if the route including the 11th step is followed, the information stored in the general register R7 is stored in Z1. The sixth to 12th steps are for determining the number of holdings shown in FIG. 7. In FIG. 7, the abscissa represents the difference $\Delta\theta p$ between the current value of $\theta p$ and the program value $\theta p'$ determined earlier by a half rotation of the crank shaft, where $\theta p$ is a program value determined by adding the results of interpolation of the lead angle of the engine r.p.m and the lead angle of intake manifold pressure programmed in ROM, and the ordinate represents the result of calculation of H=C (C=50) when $\Delta\theta p$ is smaller than 1, and $H = b - a \times \Delta\theta p$ (b=66, a=16) when $\Delta\theta p$ is equal to or larger than 1. In the 13th step, the information in Z1 (i.e., the frequency of holdings; [Z1]) is compared with the information in Z2 (i.e., actual frequency of holdings; [Z2]. If [Z1] is larger than [Z2], transfer is made to the 16th step; while if [Z1] is equal to or smaller than [Z2], transfer is made to the 14th step. In the 14th step, the fixed value $\Delta\theta$ (=2 degrees) obtained from ROM is added to the information $\theta$ stored in the memory X1, followed by transfer to the next step. The initial value of the information $\theta$ stored in the memory X1 is $\theta_0$, and changes to $\theta_0 - \Delta\theta$ subsequently in the presence of a knocking. If the 14th step is passed in the absence of a knocking, on the other hand, the value $\theta_0 + \Delta\theta$ is taken. This lead angle represents an actual ignition lead angle value. In the 15th step, the memory Z2 is cleared to zero. In the 16th step, 1 is added to the information [Z2] stored in the memory Z2, and the sum is stored in the memory Z2 which acts as a memory counter. Next, in the presence of an output signal from the decision circuit 20, the memory Z2 is cleared in the 17th step and the memory Z2 is cleared in the 18th step. In the 19th step, $\Delta\theta$ obtained from ROM is subtracted from the information stored in the memory X1 representing the ignition lead angle and the result is stored in the memory X1. In the 20th step, the information $\theta$ stored in the memory X1 is compared with the lead angle $\theta p$ as an MBT of the general register R6. If $\theta p$ is equal to or smaller than $\theta$, $\theta p$ is stored in the memory X1 in the 21th step. If $\theta p$ is larger than $\theta$, on the other hand, transfer is made to the 22nd step. In the 22nd step, the minimum lead angle value $\theta m$ (=BTDC 5 degrees) which is a programmed constant value is compared with $\theta$. If $\theta$ is not larger than $\theta mm$, $\theta mm$ is stored in the memory X1 in the 23rd step. If $\theta$ is larger than $\theta mm$, by contrast, the current value of $\theta$ continues to be stored in the memory X1.

In the 24th step, the calculation (60—lead angle $\theta$) is made for converting the lead angle value determined with reference to the top dead center of each cylinder to another point, for example, in this embodiment, to the delay angle $\theta'$ based on the angle 60 degrees before the top dead center.

The 25th step is for calculating the first and second output values m and n from the delay angle value $\theta'$. In this calculation, the correcting term $\theta A$ or $\theta B$ is subtracted from the delay angle value $\theta'$ for correction. The correcting terms $\theta A$ and $\theta B$ are required for the reason of displacement between the position of the tooth 6a of the ring gear 6 and the position 60 degrees before the top dead center and also the error between the mounting position of the rotational angle detector 7 and that of the reference angle detector 8. For these reasons, the correction is required. The correction is made in a predetermined amount in both cases. Assume that the displacement between the mounting positions of the detectors 7 and 8 is combined with the displacement of the position of the tooth of the ring gear 6 and the position 60 degrees before the top dead center (TDC) as shown in FIG. 8. In this diagram, (a) represents the actual top dead center (TDC) and 60 degrees before top dead center (BTDC60) of the first cylinder of the engine 1, (b) the output signal of the waveform shaping circuit 10, (c) the R(0) signal, (d) the R(180) signal, the (e) the data switching signal S.

In FIG. 8, it is seen from (a) and (b) that the pulse of the waveform shaping circuit 10 is displaced from the actual BTDC60 by the angle $\theta A$. This value $\theta A$ is naturally smaller than 313 degrees. In other words, the signal of the reference rotational angle is, strictly speaking, displaced from BTDC60, and therefore it is not desirable for the position of the reference rotational angle to take the waveform of the waveform shaping circuit 11. In this case, the mounting accuracy of the reference angle sensor 6b is improved if a reference is set at the position R(0) of the tooth 6a of the ring gear 6 nearest to and delayed from BTDC60. This position R(0) is displaced from BTDC60 by $\theta A$. The correction by this amount is required since R(0) is used as a reference in comparison made in the first comparator 22.

In similar fashion, the reference position for determining the ignition timing of the third and second cylinders is required to be corrected. Assume that the angular position 180 degrees behind BTDC60, i.e., the angular position 120 degrees behind TDC is ATDC120, and the position of the ring gear tooth delayed behind and nearest to ATDC120 is R(180). ATDC120 is naturally displaced from R(180). This displacement is assumed to be $\theta B$. The output representing the total delay amount is required to be corrected by $\theta B$. This correction by the amount $\theta A$ is required for the ignition timing of the first and fourth cylinders, and by the amount $\theta B$ for the ignition timing of the third and second cylinders. The amounts of correction $\theta A$ and $\theta B$ are programmed in advance in the ROM of the ignition angle setting circuit 21. The amounts $\theta A$ and $\theta B$ are subtracted respectively when the data switching signal S produced from the angular signal circuit 17 is "1" and "0" respectively. Let M be the result of correction of the angle delay value $\theta'$ by $\theta A$ and $\theta B$. Then M is expressed as 3.13 multiplied by m plus the remainder m', as follows.

$$M = 3.13 \times m + m'$$

The value m is the first output and the value m' is an angle smaller than 3.13.

Next, m' is divided by the engine speed N (r.p.s) which is the output of the counting circuit 12 for time conversion thereby to determine the value n.

$$n = \frac{P \cdot m'}{N} \quad (P: \text{An appropriate constant})$$

where 1/N is proportional to the time required for one rotation or 360 degree rotation of the ring gear 6, and the time n required for the rotation by the angle m' is expressed as 360 degrees: $m' = K/N$: n (K: an appropriate constant)
Thus, $$n = \frac{m'}{360} \cdot \frac{K}{N}$$

This shows the second output value.

The 26th step is for setting the above-calculated m and n into the first and second comparators 22 and 23 in binary code.

The 27th step is for storing the information θp from the general register R6 into the memory Y1. Upon completion of the 27th step, transfer is made back to the third step, thereby repeating the above-mentioned operations.

In this way, instruction words are programmed in the ROM of the microcomputer.

Figure 9:
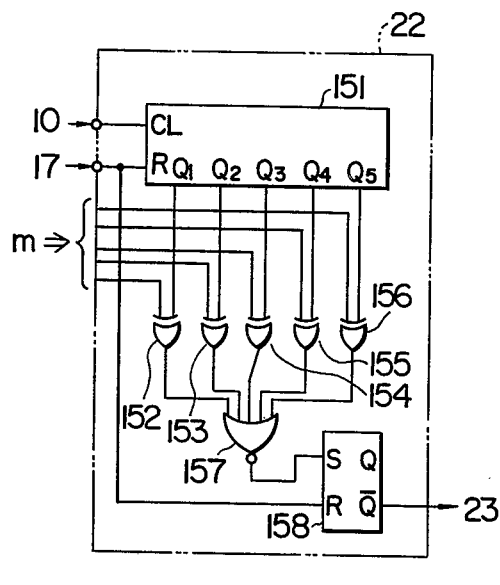

An example of the first comparator 22 is shown in detail in the circuit diagram of FIG. 9. In this diagram, the first comparator 22 comprises a binary counter 151, exclusive OR gates 152 to 156, NOR gate 157 and an R-S flip-flop 158. When the binary counter 151 and the R-S flip-flop 158 are reset in response to the reset signals R(0) and R(180) produced from the angular signal circuit 17, the binary counter 151 counts the pulses from the waveform shaping circuit 10. Each of these pulses represents about 3.13 degrees of crank angle. When this count coincides with the binary value of the first output m among the outputs of the ignition angle setting circuit 21, all the outputs of the exclusive OR gates 152 to 156 are reduced to "0" and therefore the output of the NOR gate 157 becomes "1", thus setting the R-S flip-flop 158. The rotational angle from the resetting of the R-S flip-flop 158 to the setting of the same, i.e., the rotational angle during which an "1" signal is produced at the output terminal $\bar{Q}$ of the R-S flip-flop 158 is proportional to the binary code of the first output of the ignition angle setting circuit 21. What is important here is the fact that the timing at which the output signal at the output terminal $\bar{Q}$ of the R-S flip-flop 158 falls from "1" to "0" coincides with the delay angle of the first output m of the ignition angle setting circuit 21. And since the input clock pulses to the first comparator 22 are an output of the waveform shaping circuit 10 and represent the crank angle itself, any change in crank rotations which may occur during the counting operation is reflected directly. The second comparator 23 has quite the same circuit configuration as the first comparator 22, the only difference being that the number of bits of the counter, the number of the exclusive OR gates and the number of the input gates of the NOR gates change depending on the number of input bits. In the embodiment under consideration, a 10-bit counter, ten exclusive OR gates and 10-gate input NOR gate are used. The output signal of the clock circuit 13 is used as an input clock pulse in the form of 500 KHz clock pulses C4 of a predetermined frequency. And the output signal of the first comparator 22 is applied as a reset signal for the R-S flip-flop and the counter. Also, the applied input data takes the form of the second 10-bit output value n produced from the ignition angle setting circuit 21. When the output signal of the first comparator 22 changes from "1" to "0", the counter of the second comparator 23 begins to count, so that the output thereof reverts from "1" to "0" when the second output value n of the ignition angle setting circuit 21 coincides with the number of the clock pulses C4. Thus the time point when the output of the first comparator 22 changes to "0" corresponds to the delay angle θ' of the engine r.p.m produced from the ignition angle setting circuit 21. In this way, the time point when the output of the second comparator 23 changes from "1" to "0" represents the ignition timing.

Figure 10:
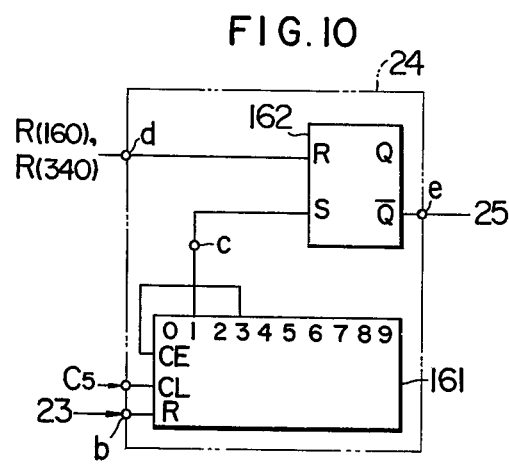

Next, the energizing circuit 24 will be explained with reference to FIG. 10. The energizing circuit 24 includes a counter with a divider 161 and an R-S flip-flop 162. The clock terminal CL of the counter 161 is impressed with the clock pulse C5 (1 MHz) of the clock cicuit 13, while the reset terminal R thereof is impressed with the output of the second comparator 23. The output "3" terminal of the counter 161 is connected to the clock-enable terminal CE, thus prohibiting the counting of more than three clock pulses.

Figure 11:
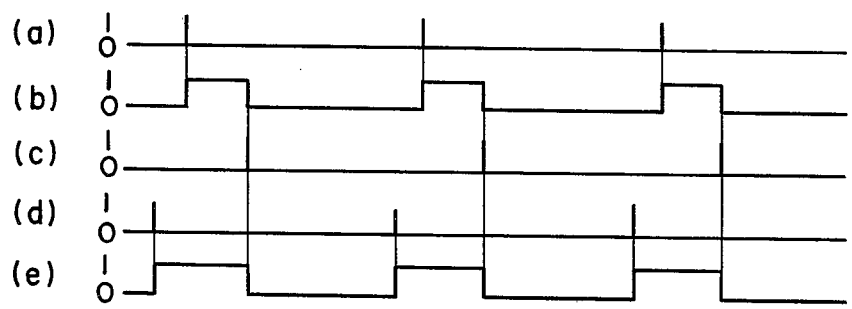
FIG. 11 shows waveforms for explaining the operation of the circuit of FIG. 10.

When the R-S flip-flop 162 is reset in response to the signals R(160) and R(340) shown in (d) of FIG. 11, the output $\bar{Q}$ rises from "0" to "0" as shown in (e) of FIG. 11. Subsequently, in response to the signals R(0) and R(180) shown in (a) of FIG. 11, the signal of the second comparator 23 as shown in (b) of FIG. 11 is produced, so that the counter 161 is reset. When this reset signal falls from "1" to "0", the counter 161 begings to count the clock pulses C5, and each time one clock pulse is counted, the signal as shown in (c) of FIG. 11 is produced from the "1" terminal. As a result, the R-S flip-flop 162 is set, and the $\bar{Q}$ output of the R-S flip-flop 162 is changed from "1" to "0" as shown in (e) of FIG. 11.

The output signal of the R-S flip-flop 162 takes the form as shown in (e) of FIG. 11. This signal is power-amplified by the ignitor 25 and drives the ignition coil 4. As long as the output signal of the R-S flip-flop 162 remains "1", the current is supplied to the primary winding of the ignition coil 4. During the time when a "0" signal is generated, on the other hand, current is cut off and a high voltage is applied to the secondary winding of the ignition coil. This high voltage is applied to the spark plug through the distributor 5, thereby generating an ignition spark.

In the above-mentioned configuration, assume that the intake pressure of the intake manifold 3 is low under the operating condition of the engine 1 and the load of the engine 1 is smaller or partial. The ignition angle setting circuit 21 sets the ignition timing at a pregrogrammed lead angle MBT and causes a sufficient torque to be generated for the engine 1.

In the case where the intake pressure is higher than a predetermined level and the load of the engine 1 is large or total, the engine 1 will knock if the ignition timing of the engine 1 is set at MBT. If the engine 1 knocks, the vibrating condition changes and the instantaneous value of the vibration waveform detected by the vibration sensor 16 increases to such an extent that this instantaneous value exceeds the average value of vibrations occurring between substantially 20 degrees before top dead center and the top dead center of each cylinder.

Figure 12:
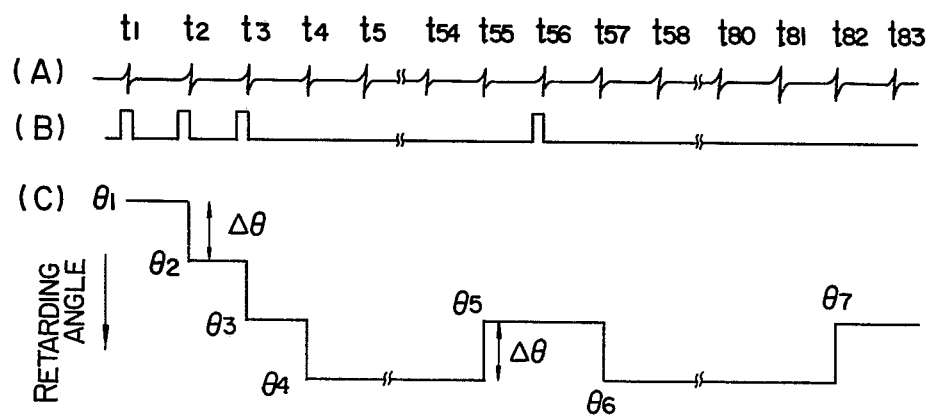
FIG. 12 shows waveforms for briefly explaining the basic technical concept of the apparatus shown in FIG. 1.

As a result, the decision circuit 20 produces a knocking signal to the ignition angle setting circuit 21, and the ignition angle setting circuit 21 subtracts the step lead angle Δθ (for example, about 1 degree) from the ignition timing, i.e., the lead angle $\theta$p in synchronism with the engine r.p.m. In this way, the lead angle value is reduced so that the ignition timing is delayed to prevent knocking of the engine 1. In the absence of knocking of the engine 1, on the other hand, the ignition angle setting circuit 21 adds $\Delta\theta$ (for instance, about 1 degree) to the current lead angle in synchronism with the engine r.p.m so that the lead angle is increased thereby to advance the ignition timing. In this case, the angle is not advanced by $\Delta\theta$ immediately in the absence of knocking but the ignition timing is held at the previous level in accordance with the characteristics of FIG. 7. This operation is shown in FIG. 12. The waveform of ignition spark is shown in (A) of FIG. 12, the output of the knocking decision circuit 20 in (B) of FIG. 12, and the controlled ignition timing in (C) of FIG. 12. As noted, if the knocking signal is generated at time point t1, the next ignition timing t2 is $\theta 1 - \Delta\theta = \theta 2$: if the knocking signal is generated at time point t2, the ignition timing t3 is $\theta 2 - \Delta\theta = \theta 3$; if the knocking signal is generated at time point t3, the ignition timing t4 is $\theta 3 - \Delta\theta = \theta 4$. In this way, each time of knocking, the lead angle is reduced by $\Delta\theta$, that is, the delay angle is increased. At the time point t4 when the knocking signal fails to be produced, transfer is made to the sixth step in the flowchart of FIG. 6. In the sixth to 12th steps, the number of holdings H1 conforming to the characteristics of FIG. 7 is obtained at time point t4, thus starting the holding. Next, the number of holdings H2 is determined at time point t5. In this way, in the absence of knocking, the number of holdings is determined each half rotation of the crank shaft. On the other hand, the memory Z2 begins to count at time point t4, and counts up to 2 at time point t5 and, 3 at time point t6, thus proceeding to count up to 50 at time point t53. At time point t54 when the number of holdings H is determined at 50, the lead angle $\theta 5$ for t55 is represented by $\theta 4 + \Delta\theta$. Then the memory counter is cleared and the count is reduced to 1. Upon generation of the knocking signal at t56, the lead angle $\theta b$ for t57 is represented by $\theta 5 - \Delta\theta$. At the time point t56, the memory counter Z2 is cleared. At the time point t57, the memory counter Z2 begins to count while at the same time beginning to hold. At time point t80, the number of holdings is determined at 50 and the count of the memory counter Z2 at 23. When $\Delta\theta$p is increased so that the number of holdings at time point 81 reaches 17 upon the pressing of the engine throttle valve pedal, the holding operation is released, with the result that the lead angle value $\theta 7$ for t82 takes the value $\theta 6 + \Delta\theta$. The above operation is repeated. As obvious from the characteristics diagram of FIG. 7, the abscissa represents a value corresponding to the program value of MBT determined by the engine r.p.m and the intake manifold pressure. In view of the fact that this value is the difference between before and after the value for each half rotation of the crank shaft, the smaller the difference, the larger the number of holdings. When the difference is large, on the other hand, the number of holdings is reduced in such a manner that the holding of more than four in difference, for example, is prohibited. In other words, as long as the engine operation is steady, the lead angle is held is stable state as far as possible, while in the transient state, the tracing is quickened.

In the above-mentioned embodiments, the angle by which is advance is made is set at $\Delta\theta$ and the angle by which delay is made at $\Delta\theta$. Instead, the angle by which delay is made may of course be set at $2\Delta\theta$, $3\Delta\theta$, $4\Delta\theta$ or so forth.

In the ignition angle setting circuit 21, the maximum value of the lead angle is controlled at MBT and the minimum value at $\theta$mm. In no case, is the lead angle set at a value out of the range from MBT to $\theta$mm, thus preventing the engine 1 from stalling or reverse rotation.

In the above-mentioned embodiments, the transient operating condition of the internal combustion engine is detected by calculation of the difference in the program value of MBT at each half rotation of the crank shaft. As an alternative, it may be detected with equal effect by the change in intake manifold pressure or r.p.m of the engine.

It will thus be understood from the foregoing description that according to the present invention, if a transient operating condition of the internal combustion engine is detected, the frequency at which the delay angle is maintained constant is reduced to change the delay angle control of the ignition timing. Therefore, when the operating condition of the internal combustion engine changes and the ignition timing delay angle is desired to be reduced upon disappearance of the knocking, the delay angle of ignition timing is reduced rapidly. As a result, the ignition timing is effectively advanced, thus leading to the great advantage that the noise under the steady operation of the internal combustion engine are reduced on the one hand and the performance under the transient operation is improved on the other hand at the same time.

We claim:

1. In a method for controlling the timing of ignition spark by repeating, in each rotation cycle of an output shaft of an internal combustion engine, the steps of detecting a presence and absence of knock of said internal combustion engine, and retarding and advancing the timing of ignition spark which is to be supplied in a current rotation cycle of said output shaft relative to the timing of ignition spark which was supplied in a preceding rotation cycle of said output shaft in response to respective outputs of said detection step indicative of said presence and absence of knock, the improvement comprising the steps of:

establishing a desired number of rotation cycles of said output shaft in response to the output of said detection step indicative of said absence of knock, said desired number being varied in accordance with operating conditions of said internal combustion engine;

counting a number of rotation cycles of said output shaft in response to the detection output indicative of said absence of knock; and holding, until the counted number of rotation cycles reaches the established desired number of rotation cycles, the timing of ignition spark which is to be supplied in said current rotation cycle of said output shaft unchanged from the timing of ignition spark which was supplied in said preceding rotation cycle.

2. In a method for controlling a timing of ignition spark by repeating, in each rotation cycle of an output shaft of an internal combustion engine, the steps of detecting a presence and absence of knock of said internal combustion engine, and retarding and advancing the timing of ignition spark which is to be supplied in a current rotation cycle of said output shaft relative to the timing of ignition spark which was supplied in a preceding rotation cycle of said output shaft in response to respective outputs of said detection step indicative of said presence and absence of knock, the improvement comprising the steps of:

detecting operating conditions of said internal combustion engine;

establishing, in each rotation cycle of said output shaft a timing of ignition spark in accordance with the detected operating conditions;

calculating a value of change in two timings of ignition spark established by said establishing step in said preceding rotation cycle and said current rotation cycle;

establishing a desired number of rotation cycles of said output shaft in response to the output of said detection step indicative of said absence of knock, said desired number being varied in accordance with the calculated value of change in said two timings of ignition spark;

counting a number of rotation cycles of said output shaft in response to the detection output indicative of said absence of knock; and holding, until the counted number of rotation cycles reaches the established desired number of rotation cycles, the timing of ignition spark which is to be supplied in said current rotation cycles of said output shaft unchanged from the timing of ignition spark which was supplied in said preceding rotation cycle of said output shaft.

* * * * *